(12) United States Patent
Cederlof

(10) Patent No.: US 9,282,301 B1
(45) Date of Patent: Mar. 8, 2016

(54) SYSTEM FOR IMAGE PROJECTION

(75) Inventor: Colter E. Cederlof, San Jose, CA (US)

(73) Assignee: Rawles LLC, Wilmignton, DE (US)

( * ) Notice: Subject to any disclaimer, the term of this patent is extended or adjusted under 35 U.S.C. 154(b) by 576 days.

(21) Appl. No.: 13/558,128

(22) Filed: Jul. 25, 2012

(51) Int. Cl.
G09G 5/00 (2006.01)
H04N 9/31 (2006.01)

(52) U.S. Cl.
CPC .................. H04N 9/3147 (2013.01)

(58) Field of Classification Search
CPC ....... G06T 19/006; G06T 19/00; G06T 15/00; G06T 15/50; H04N 9/3147
USPC ......................................................... 345/629
See application file for complete search history.

(56) References Cited

U.S. PATENT DOCUMENTS

| | | | |
|---|---|---|---|
| 6,431,711 B1* | 8/2002 | Pinhanez | 353/69 |
| 2007/0097334 A1* | 5/2007 | Damera-Venkata et al. | 353/94 |
| 2009/0147004 A1* | 6/2009 | Ramon et al. | 345/428 |
| 2011/0205341 A1* | 8/2011 | Wilson et al. | 348/51 |

OTHER PUBLICATIONS

Zhou et al.; Multi-projector display with continuous self-calibration; 2008; PROCAMS '08 Proceedings of the 5th ACM/IEEE International Workshop on Projector camera systems Article No. 3; pp. 1-7.*

* cited by examiner

Primary Examiner — Peter Hoang
(74) Attorney, Agent, or Firm — Athorus, PLLC

(57) ABSTRACT

A system for projecting an image onto a common surface location from multiple augmented reality functional nodes is provided. Projecting an image from multiple environments provides an overall brighter image for a user and provides the ability to utilize small and/or lower power projectors in an augmented reality environment while still having the ability to display a bright image.

21 Claims, 9 Drawing Sheets

SYSTEM FOR IMAGE PROJECTION

BACKGROUND

Augmented reality allows interaction among users, real-world objects, and virtual or computer-generated objects and information within an environment. The environment may be, for example, a room equipped with computerized projection and imaging systems that enable presentation of images on various objects within the room and facilitate user interaction with the images and/or objects. The augmented reality may range in sophistication from partial augmentation, such as projecting a single image onto a surface and monitoring user interaction with the image, to full augmentation where an entire room is transformed into another reality for the user's senses. The user can interact with the environment in many ways, including through motion, gestures, voice, and so forth.

To enable such augmented reality environments, however, there is a continuing need for improved projection systems. Such improvements might include lighter weight, smaller form factors, and less obtrusive integration into the environment.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Augmented reality environments allow users to interact with physical and virtual objects in a physical space. Augmented reality environments are formed through systems of resources such as cameras, projectors, computing devices with processing and memory capabilities, and so forth. The projectors project images onto the surroundings that define the environment and the cameras monitor and capture user interactions with such images.

An augmented reality environment is commonly hosted or otherwise set within a surrounding area, such as a room, building, or other type of space. In some cases, the augmented reality environment may involve the entire surrounding area. In other cases, an augmented reality environment may involve a localized area of a room, such as a reading area or entertainment area.

This disclosure describes, in part, a system that allows for the synchronous projection of an image or series of images from multiple projectors to a single location within the environment. The multiple projector system may be implemented in many ways. One illustrative implementation is described below in which an augmented reality environment is created within a room. The system includes two or more projectors and at least one image capture device, such as a camera. The image capture device may be part of or separate from one of the projector systems. In other implementations, multiple image capture devices may be utilized, one in communication with each projection system.

Multiple implementations of various projection and image capture systems are described. For instance, in one implementation, at least one of the projection and image capture systems is implemented as a table lamp. However, the various implementations of the architecture described herein are merely representative.

Figure 1:
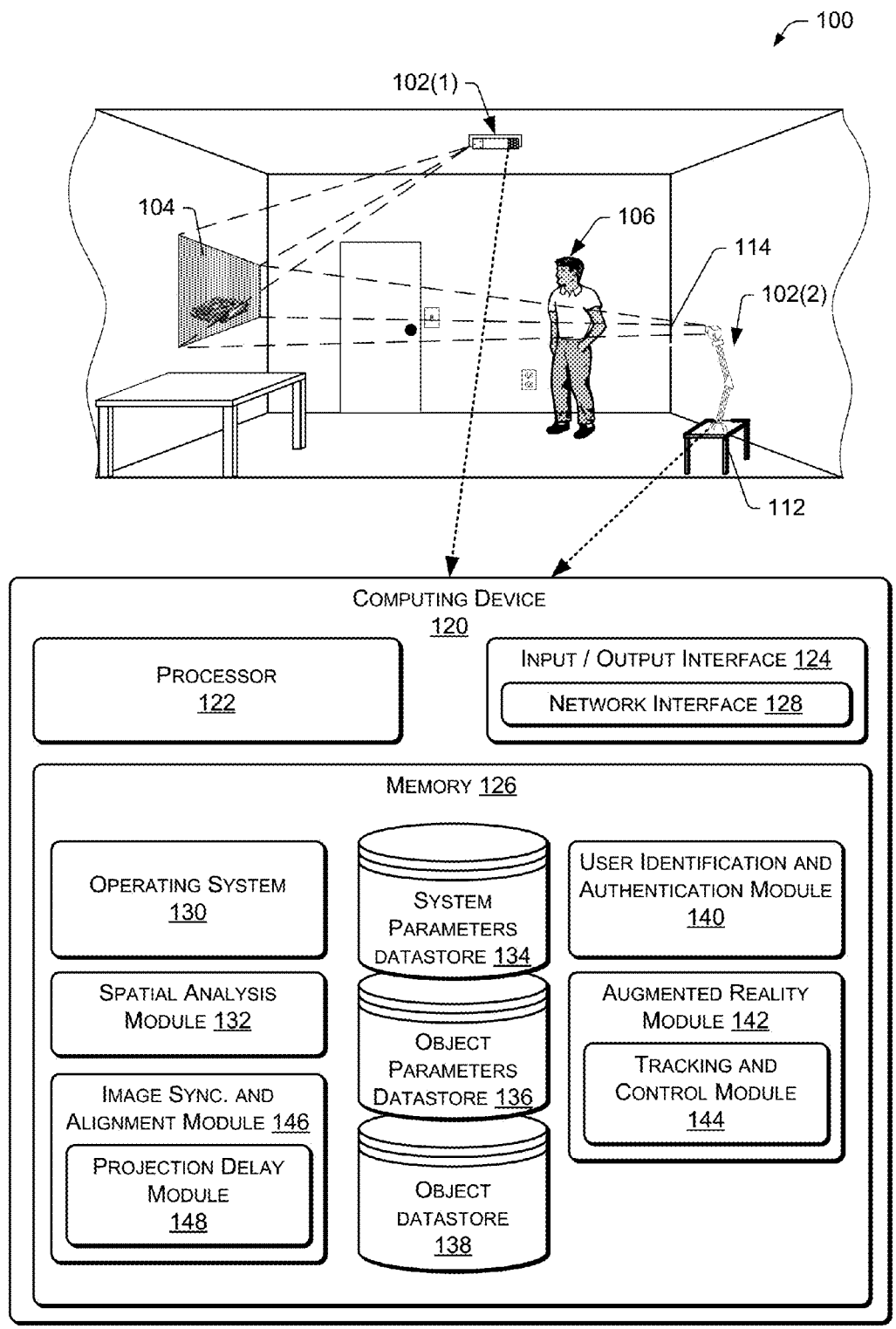
FIG. 1 shows an illustrative scene with an augmented reality environment hosted in an environmental area, such as a room.

FIG. 1 shows an illustrative augmented reality environment 100 created within a scene, and hosted within an environmental area, which in this case is a room. Two augmented reality functional nodes (ARFN) 102(1), 102(2) are shown within the room. Each ARFN contains a projector, an image capture device, and computing resources that are used to generate the augmented reality environment 100. In this illustration, the first ARFN 102(1) is a fixed mount system that may be mounted within the room, such as to the ceiling, although other placements are possible. The first ARFN 102(1) projects images onto the scene, such as onto a surface 104 or screen on a wall of the room. A first user 106 may watch and interact with the images being projected onto the surface 104, and the ceiling-mounted ARFN 102(1) may capture that interaction. One implementation of the first ARFN 102(1) is provided below in more detail with reference to FIG. 2.

A second ARFN 102(2) is embodied as a table lamp, which is shown sitting on a desk 112. The second ARFN 102(2) may also project images onto the surface 104. The images projected by the first ARFN 102(1) and second ARFN 102(2) may be projected onto a common surface location, aligned and in-focus. Projecting an image from multiple projectors onto a common surface location results in a brighter, higher contrast image. In addition, projecting from multiple locations allows the user 106 to interact with the image without completely occluding at least a portion of the image. For example, if the user 106 is near the surface 104 and pointing at the image, only one of the two projections may be occluded by the user's arm. Thus, the image will still appear as a complete image on the surface 104. One implementation of the second ARFN 102(2) is provided below in more detail with reference to FIG. 3.

The locations discussed with respect to FIG. 1 are examples only. In other implementations, one or more ARFNs may be placed around the room in any number of arrangements, such as on furniture, on the wall, beneath a table, and so forth. Likewise, more than two ARFNs may be utilized with implementations of the present invention. In some implementations, only a single ARFN may be used in conjunction with a typical projector. For example, a typically projector may project an image onto a surface and an image capture device of an ARFN may capture that image. The ARFN may then adjust and project a second image onto the common surface location that overlays the image projected by the typical projector to create a composite image.

Associated with each ARFN 102(1)-(2), or with a collection of ARFNs, is a computing device 120, which may be located within the augmented reality environment 100 or disposed at another location external to it. Each ARFN 102 may be connected to the computing device 120 via a wired network, a wireless network, or a combination of the two. The computing device 120 has a processor 122, an input/output interface 124, and a memory 126. The processor 122 may include one or more processors configured to execute instructions. The instructions may be stored in memory 126, or in other memory accessible to the processor 122, such as storage in cloud-based resources.

The input/output interface 124 may be configured to couple the computing device 120 to other components, such as projectors, cameras, microphones, other ARFNs, other computing devices, and so forth. The input/output interface 124 may further include a network interface 128 that facilitates connection to a remote computing system, such as cloud computing resources. The network interface 128 enables access to one or more network types, including wired and wireless networks. More generally, the coupling between the computing device 120 and any components may be via wired technologies (e.g., wires, fiber optic cable, etc.), wireless technologies (e.g., RF, cellular, satellite, Bluetooth, etc.), or other connection technologies.

The memory 126 may include computer-readable storage media ("CRSM"). The CRSM may be any available physical media accessible by a computing device to implement the instructions stored thereon. CRSM may include, but is not limited to, random access memory ("RAM"), read-only memory ("ROM"), electrically erasable programmable read-only memory ("EEPROM"), flash memory or other memory technology, compact disk read-only memory ("CD-ROM"), digital versatile disks ("DVD") or other optical disk storage, magnetic cassettes, magnetic tape, magnetic disk storage or other magnetic storage devices, or any other medium which can be used to store the desired information and which can be accessed by a computing device.

Several modules such as instructions, datastores, and so forth may be stored within the memory 126 and configured to execute on a processor, such as the processor 122. An operating system module 130 is configured to manage hardware and services within and coupled to the computing device 120 for the benefit of other modules.

A spatial analysis module 132 is configured to perform several functions which may include analyzing a scene to generate a topology, recognizing objects in the scene, dimensioning the objects, and creating a 3D model of the scene. Characterization may be facilitated using several technologies including structured light, light detection and ranging (LIDAR), optical time-of-flight, ultrasonic ranging, stereoscopic imaging, radar, and so forth either alone or in combination with one another. The spatial analysis module 132 provides the information used within the augmented reality environment to provide an interface between the physicality of the scene and virtual objects and information.

A system parameters datastore 134 is configured to maintain information about the state of the computing device 120, the input/output devices of the ARFNs, and so forth. For example, system parameters may include current aspect ratio, as well as pan and tilt settings of the cameras and projectors of each ARFN. As used in this disclosure, the datastore may include lists, arrays, databases, and other data structures used to provide storage and retrieval of data.

An object parameters datastore 136 in the memory 126 is configured to maintain information about the state of objects within the scene. The object parameters may include the surface contour of the object, overall reflectivity, color, and so forth. This information may be acquired from the ARFN, other input devices, or via manual input and stored within the object parameters datastore 136.

An object datastore 138 is configured to maintain a library of pre-loaded reference objects. This information may include assumptions about the object, dimensions, and so forth. For example, the object datastore 138 may include a reference object of a beverage can and include the assumptions that beverage cans are either held by a user or sit on a surface, and are not present on walls or ceilings. The spatial analysis module 132 may use this data maintained in the datastore 138 to test dimensional assumptions when determining the dimensions of objects within the scene. In some implementations, the object parameters in the object parameters datastore 136 may be incorporated into the object datastore 138. For example, objects in the scene which are temporally persistent, such as walls, a particular table, particular users, and so forth may be stored within the object datastore 138. The object datastore 138 may be stored on one or more of the memory of the ARFN, storage devices accessible on the local network, or cloud storage accessible via a wide area network.

A user identification and authentication module 140 is stored in memory 126 and executed on the processor(s) 122 to use one or more techniques to verify users within the environment 100. In one implementation, the ARFN 102 may capture an image of the user's face and the spatial analysis module 132 reconstructs 3D representations of the user's face. Rather than 3D representations, other biometric profiles may be computed, such as a face profile that includes key biometric parameters such as distance between eyes, location of nose relative to eyes, etc. In such profiles, less data is used than full reconstructed 3D images. The user identification and authentication module 140 can then match the reconstructed images (or other biometric parameters) against a database of images (or parameters), which may be stored locally or remotely on a storage system or in the cloud, for purposes of authenticating the user. If a match is detected, the user is permitted to interact with the system.

An augmented reality module 142 is configured to generate augmented reality output in concert with the physical environment. The augmented reality module 142 may employ essentially any surface, object, or device within the environment 100 to interact with the users. The augmented reality module 142 may be used to track items within the environment that were previously identified by the spatial analysis module 132. The augmented reality module 142 includes a tracking and control module 144 configured to track one or more items within the scene and accept inputs from or relating to the items.

An image synchronization and alignment module 146 is stored in memory 126 and executed on the processor(s) 122 to use one or more techniques to synchronize and align multiple ARFNs 102 and project images from each of those ARFNs 102 to a common location, thereby providing a synchronized composite image. In some implementations, the image synchronization and alignment module 146 may designate one ARFN 102 as a primary projector, project an image from that projector and then provide instructions to a secondary ARFN to capture the projected image with an image capture device. Using the captured image, the secondary ARFN may align its projector in the direction of the surface onto which the primary projector is projecting an image and determine an appropriate aspect ratio for projecting the same image. The secondary projector may then project a duplicate of the image onto the same location, thereby providing a composite image to the user. In some implementations, the image synchronization module 146 may utilize one or both of the ARFNs 102 to fine tune the projected images to ensure that the resulting composite image is synchronized and in focus.

The image synchronization and alignment module 146 may also include a projection delay module 146. The projection delay module 148 may maintain processing information for each of the ARFNs. For example, the projection delay module may maintain information as to the time duration required by each ARFN 120 to process and project an image. That information may then be used to compute a projection delay between two or more ARFNs, indicating how long an ARFN with a lower time duration needs to wait before processing and projecting an image. For example, if it takes the first ARFN 102(1) 0.3 seconds to process and begin projecting an image and it takes the second ARFN 102(2) 0.8 seconds to process and begin projecting an image, the projection delay between the two ARFNs is 0.5 seconds. In this example, the second ARFN 102(2) may be instructed by the computing device 120 to initiate projection of the image and 0.5 seconds later the first ARFN 102(1) may be instructed to initiate projection of the image. Alternatively, both ARFNs may receive instructions to being projecting an image that include a time delay. The time delay for the second ARFN 102(2) would be 0.0 seconds and the time delay for the first ARFN 102(1) would be 0.5 seconds. By implementing a projection delay, ARFNs with different computing capabilities may be used in the same system and project synchronized images.

The ARFNs 102 and computing components of device 120 that have been described thus far may be operated to create an augmented reality environment in which multiple ARFNs project images onto a common surface location to provide a user with a brighter and higher contrast composite image. The users' movements, voice commands, and other interactions may be captured by the ARFNs 102 to facilitate user input to the environment and manipulation with the composite image.

Figure 2:
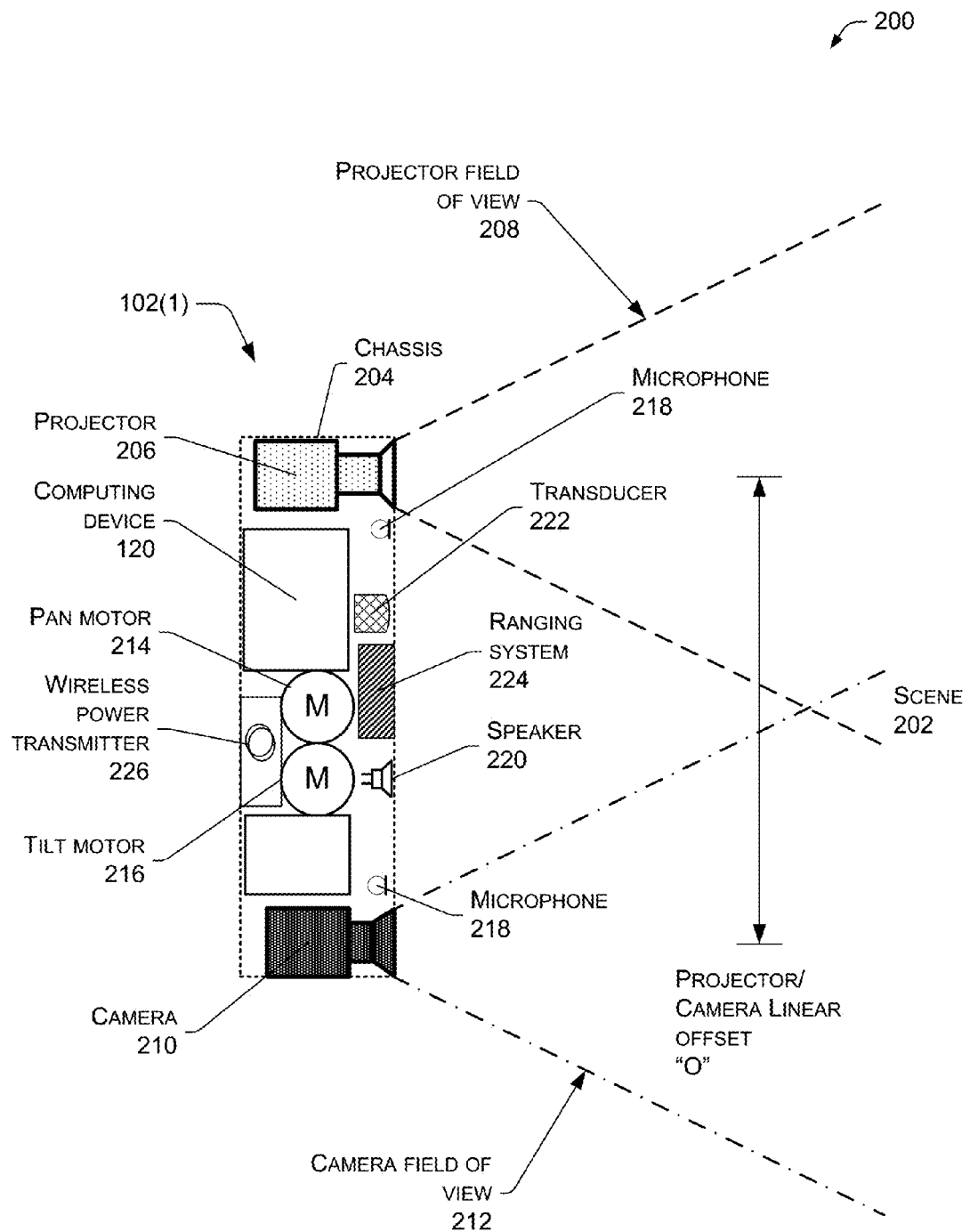
FIG. 2 shows an implementation of a projection and image capturing system.

FIG. 2 shows an illustrative schematic 200 of the first augmented reality functional node 102(1) and selected components. The first ARFN 102(1) is configured to scan at least a portion of a scene 202 and the objects therein. The ARFN 102(1) may also be configured to provide augmented reality output, such as images, sounds, and so forth.

A chassis 204 holds the components of the ARFN 102(1). Within the chassis 204 may be disposed a projector 206 that generates and projects images into the scene 202. These images may be visible light images perceptible to the user, visible light images imperceptible to the user, images with non-visible light, or any combination thereof. The projector 206 may be implemented with any number of technologies capable of generating an image and projecting that image onto a surface within the environment. Suitable technologies include a digital micromirror device (DMD), liquid crystal on silicon display (LCOS), liquid crystal display, 3LCD, and so forth. The projector 206 has a projector field of view 208 which describes a particular solid angle. The projector field of view 208 may vary according to changes in the configuration of the projector. For example, the projector field of view 208 may narrow upon application of an optical zoom to the projector. In some implementations, a plurality of projectors 206 may be used. Further, in some implementations, the projector 206 may be further configured to project patterns, such as non-visible infrared patterns and/or watermarks, that can be detected by camera(s) and used for alignment of multiple images onto a common surface. The projector 206 may comprise a microlaser projector, a pico-projector, a digital light projector (DLP), cathode ray tube (CRT) projector, liquid crystal display (LCD) projector, light emitting diode (LED) projector or the like.

A camera 210 may also be disposed within the chassis 204. The camera 210 is configured to image the scene in visible light wavelengths, non-visible light wavelengths, or both. The camera 210 may be implemented in several ways. In some instances, the camera may be embodied as an RGB camera. In other instances, the camera may include ToF sensors. In still other instances, the camera 210 may be an RGBZ camera that includes both ToF and RGB sensors. The camera 210 has a camera field of view 212 which describes a particular solid angle. The camera field of view 212 may vary according to changes in the configuration of the camera 210. For example, an optical zoom of the camera may narrow the camera field of view 212. In some implementations, a plurality of cameras 210 may be used.

The chassis 204 may be mounted with a fixed orientation, or be coupled via an actuator to a fixture such that the chassis 204 may move. Actuators may include piezoelectric actuators, motors, linear actuators, and other devices configured to displace or move the chassis 204 or components therein such as the projector 206 and/or the camera 210. For example, in one implementation, the actuator may comprise a pan motor 214, tilt motor 216, and so forth. The pan motor 214 is configured to rotate the chassis 204 in a yawing motion. The tilt motor 216 is configured to change the pitch of the chassis 204. By panning and/or tilting the chassis 204, different views of the scene may be acquired. The spatial analysis module 132 may use the different views to monitor objects within the environment.

One or more microphones 218 may be disposed within the chassis 204, or elsewhere within the scene. These microphones 218 may be used to acquire input from the user, for echolocation, location determination of a sound, or to otherwise aid in the characterization of and receipt of input from the scene. For example, the user may make a particular noise, such as a tap on a wall or snap of the fingers, which are pre-designated to initiate an augmented reality function. The user may alternatively use voice commands. Such audio inputs may be located within the scene using time-of-arrival differences among the microphones and used to summon an active zone within the augmented reality environment. Further, the microphones 218 may be used to receive voice input from the user for purposes of identifying and authenticating the user. The voice input may be received and passed to the user identification and authentication module 122 in the computing device 104 for analysis and verification.

One or more speakers 220 may also be present to provide for audible output. For example, the speakers 220 may be used to provide output from a text-to-speech module, to playback pre-recorded audio, etc.

A transducer 222 may be present within the ARFN 102(1), or elsewhere within the environment, and configured to detect and/or generate inaudible signals, such as infrasound or ultrasound. The transducer may also employ visible or non-visible light to facilitate communication. These inaudible signals may be used to provide for signaling between accessory devices and the ARFN 102(1).

A ranging system 224 may also be provided in the ARFN 102 to provide distance information from the ARFN 102 to an object or set of objects. The ranging system 224 may comprise radar, light detection and ranging (LIDAR), ultrasonic ranging, stereoscopic ranging, and so forth. In some implementations, the transducer 222, the microphones 218, the speaker 220, or a combination thereof may be configured to use echolocation or echo-ranging to determine distance and spatial characteristics.

A wireless power transmitter 226 may also be present in the ARFN 102, or elsewhere within the augmented reality environment. The wireless power transmitter 226 is configured to transmit electromagnetic fields suitable for recovery by a wireless power receiver and conversion into electrical power for use by active components in other electronics, such as a non-passive screen 118. The wireless power transmitter 226 may also be configured to transmit visible or non-visible light to communicate power. The wireless power transmitter 226 may utilize inductive coupling, resonant coupling, capacitive coupling, and so forth.

In this illustration, the computing device 120 is shown within the chassis 204. However, in other implementations all or a portion of the computing device 120 may be disposed in another location and coupled to the ARFN 102(1). This coupling may occur via wire, fiber optic cable, wirelessly, or a combination thereof. Furthermore, additional resources external to the ARFN 102(1) may be accessed, such as resources in another ARFN accessible via a local area network, cloud resources accessible via a wide area network connection, or a combination thereof.

The ARFN 102(1) is characterized in part by the offset between the projector 206 and the camera 210, as designated by a projector/camera linear offset "O". This offset is the linear distance between the projector 206 and the camera 210. Placement of the projector 206 and the camera 210 at distance "O" from one another aids in the recovery of structured light data from the scene. The known projector/camera linear offset "O" may also be used to calculate distances, dimensioning, and otherwise aid in the characterization of objects within the scene 202. In other implementations, the relative angle and size of the projector field of view 208 and camera field of view 212 may vary. Also, the angle of the projector 206 and the camera 210 relative to the chassis 204 may vary.

Due to this offset "O", the projector 206 and camera 210 employ separate optics paths. That is, the projector 206 employs a set of lenses to project images along a first optics path therein, and the camera 210 employs a different set of lenses to image the scene by capturing the light scattered by the surroundings.

In other implementations, the components of the ARFN 102(1) may be distributed in one or more locations within the environment 100. As mentioned above, microphones 218 and speakers 220 may be distributed throughout the scene. The projector 206 and the camera 210 may also be located in separate chassis 204.

As noted above, the design of the first ARFN 102(1) employs a projector/camera offset where the camera and projector are linearly spaced apart. While this may provide some advantages, one drawback is that the architecture has a comparatively larger form factor as two sets of lenses are used to project and image a scene. Accordingly, another implementation of the ARFN, as represented by the ARFN 102(2) in FIG. 1, removes the offset through a design that allows the projector and camera to share a common optics path. In this design, the form factor may be reduced. In the example shown in FIG. 1, the ARFN 102(2) is embodied as a common table lamp, where the projector and camera reside in a head of the lamp.

Figure 3:
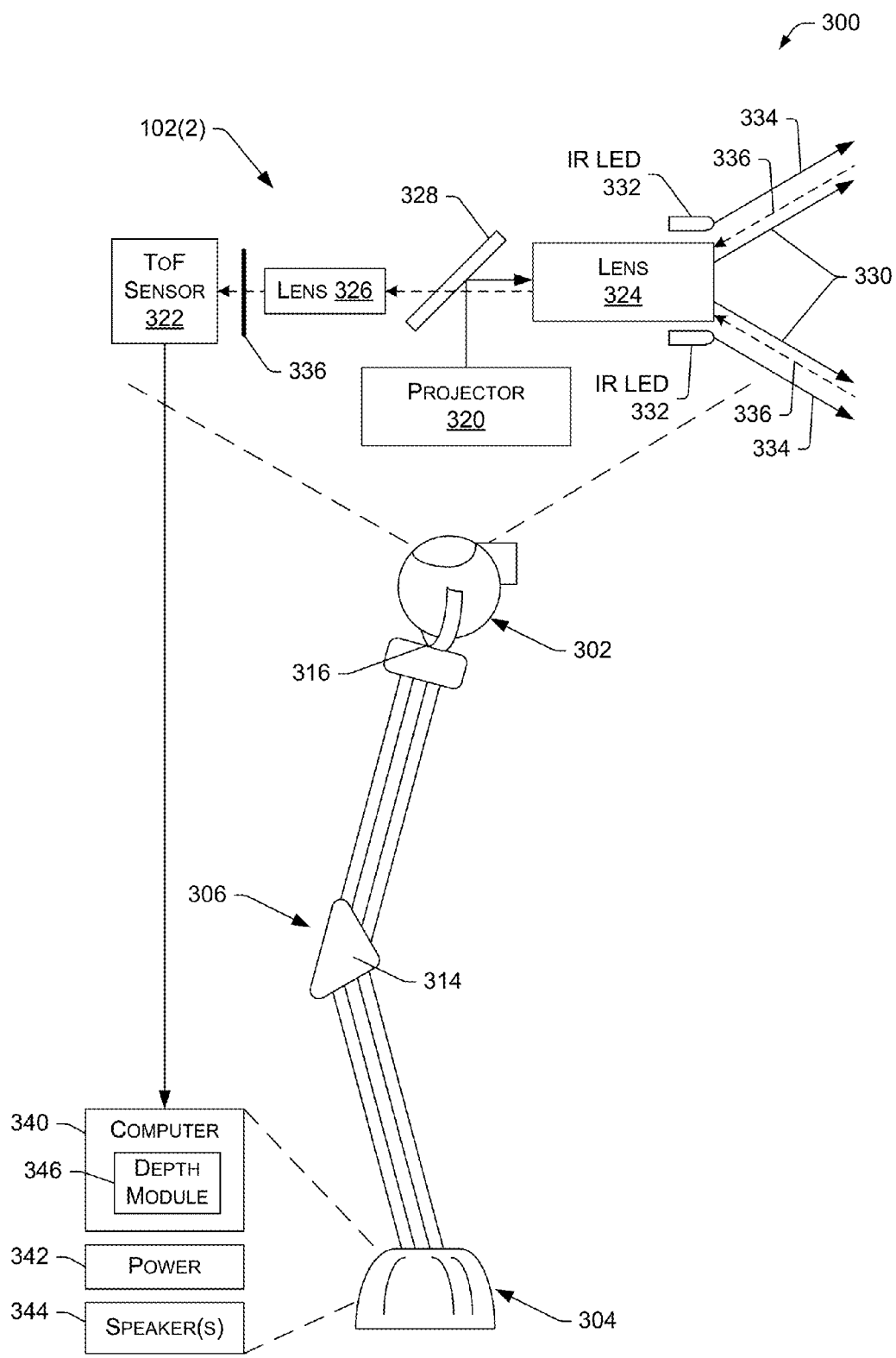
FIG. 3 shows another implementation of a projection and image capturing system.

FIG. 3 shows one implementation of the ARFN 102(2), implemented as part of a table lamp, although it may be incorporated into other familiar types of furniture. The table lamp 300 has a head 302 attached to a base 304 by a movable arm mechanism 306. Any configuration of the arm mechanism 306 may be used. In the illustrated implementation, the head 302 is connected to the arm mechanism 306 via a universal connector 316 that enables at least two degrees of freedom (e.g., along tilt and pan axes). In other implementations, the head 302 may be mounted to the arm mechanism 306 in a fixed manner, with no movement relative to the arm mechanism 306, or in a manner that enables more or less than two degrees of freedom.

The head 302 holds several components, including a projector 320 and a time of flight (ToF) sensor 322. In this example, the ToF sensor 322 measures IR signal reflections from objects within the scene. The ToF sensor 322 may be implemented as a standalone sensor, or as part of a camera. The head also contains one or more lenses, including a first lens 324 and a second lens 326. The first lens 324 may be implemented in a number of ways, including as a fixed lens, wide angle lens, or as a zoom lens. When implemented as a zoom lens, the lens may have any zoom range, with one example being 17-50 mm. Use of a zoom lens also offers additional advantages in that a zoom lens permits a changeable field of view, which can increase pixel resolution for better recognition of identifiers, edge detection or other markers used to align projection of images.

The second lens 326 is provided to adjust for the differences between the projection imager and the ToF imager. This allows for the device to set relative coverage of the two imagers (e.g., overscan/underscan).

The projector 320 projects an image that is reflected off an angled beam splitter 328 and out through the lens 324. The beam splitter 328 may be, for example, embodied as a dichroic beam splitter having a mirrored prism assembly that employs dichroic optical coatings to divide light. The projected image has a field of view represented by the outgoing pair of arrows 330. In this manner, the visible and high intensity light from the projector can be zoomed for image projection on a wide range of surfaces, from near view to far view surfaces.

One or more IR emitters 332, such as IR LEDs, are positioned in the head 302 relative to the lens 324. The IR emitters 332 direct IR light in the direction of the projected image to illuminate the scene onto which the images are being projected. The IR emitters 332 may be arranged such that the illumination field is wider than the projected field, as represented by the outgoing pair of arrows 334.

The IR signals are scattered from objects in the scene and returned to the lens 324, as represented by the incoming pair of arrows 336. The captured IR signals are passed through the lens 324 and through the dichroic beam splitter 328 to the secondary lens 326. The IR signals are then passed through an IR filter 336 (or other filter type) to the ToF sensor 322. Accordingly, the IR signals are emitted out from the head 302, scattered by the objects, and collected by the head 302 for capture by the ToF sensor 322 as a way to image the scene. This technique is performed in lieu of using structured light, as in the implementation of the first ARFN 102(1).

The lamp-based ARFN 102(2) may also be equipped with one or more components in the base 304. In this example, a computer 340 resides in the base 304, along with power components 342 and one or more speakers 344. The computer may include processing and memory to execute instructions. A depth module 346 may be executed by the computer 340 to measure a time of flight for an IR signal (or other modulated light output). The time-of-flight value may be derived as a function of a time lapse between emission from an IR LED 332 and capture by the ToF sensor 322. Alternatively, the time-of-flight value may be derived as a function of the phase difference between the modulated light output and the returned light. The depth module may be implemented in software or hardware. It is noted that in other implementations, the components shown as residing in the base 304 may reside in the head 302 or arm mechanism 306. For instance, the computer 340 may be located in the head, and the speakers 344 may be distributed in multiple locations, including the base 304, arm mechanism, and/or the head 302.

Notice that in this implementation of FIG. 3, the projector 320 and the sensor 322 share a common optics path through a common lens 324. As a result, the ARFN 102(2) may be made more compact for use in a smaller form factor, as one set of lenses are removed in this design as compared to the offset design for FIG. 2.

Figure 4:
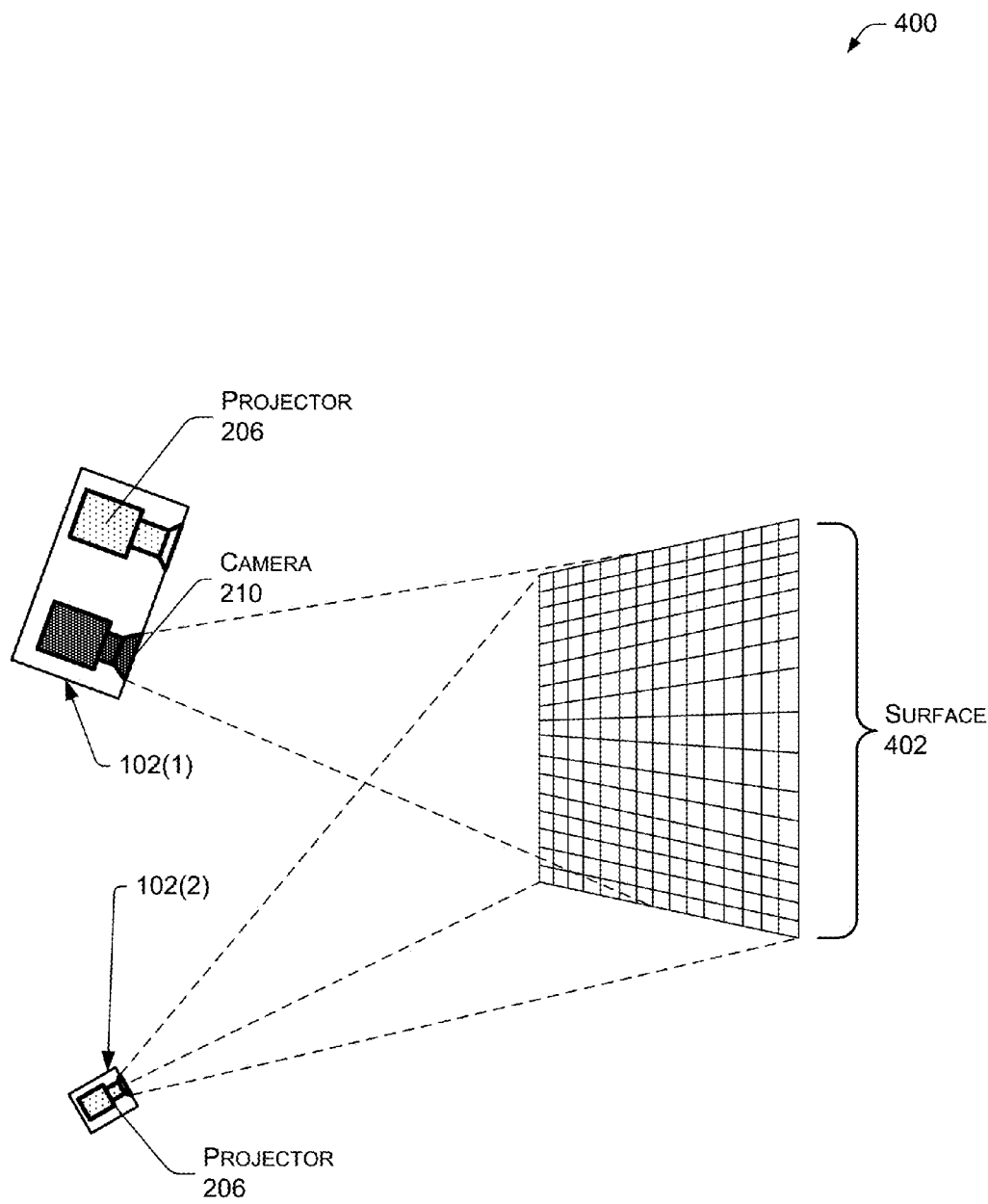
FIG. 4 illustrates one example implementation of creating a composite image in an augmented reality environment.

FIG. 4 illustrates one example operation 400 of the second ARFN 102(2) projecting an image onto a surface 402 and the first ARFN 102(1) capturing the projected image with a camera. The captured image is used to align the projector 206 of the first ARFN 102(1) with the projected image such that the same image may be projected onto the same surface at the same location. Projecting the image from multiple sources onto a common surface location 402 results in a composite image that is brighter and has a higher contrast than either of the images individually. This allows multiple smaller powered and/or smaller projectors to be used throughout an environment and combined when needed to project an image.

In this illustration, the projector 206 within the second ARFN 102(2) projects an image or series of images (e.g., video) onto the surface 402. Projection of an image onto a surface may be done in response to receiving a user command to project an image, such as detecting a gesture or voice command from a user to project an image onto the surface 402. Upon receiving a command to project an image onto a surface, the system may determine if multiple ARFNs should be used to project a brighter composite image. For example, one of the ARFNs, such as ARFN 102(1) may evaluate the environment to determine the light level and/or the reflectivity of the surface onto which the image is to be projected. If multiple ARFNs are to be used, the one with the longest time for processing and projecting an image may be identified. In this instance, the ARFN 102(2) may be identified as one of two projectors that are to project an image and that it has the longest processing time. In response to the users command, the projector 206 of ARFN 102(2) may orient itself, adjust the camera and begin projecting the requested image.

The first ARFN 102(1) may capture the projected image using the camera 201 and orient its projector in the same direction as the projected image. With the captured image, the first ARFN 102(1) may determine and adjust the aspect ratio of the projector 206 of ARFN 102(1) to match that of the projected image and begin projecting the same image onto the same location of the surface 402.

As the two images are projected, adjustments may be made by one or both of the ARFNs to further align, adjust and/or focus the images to provide an in focus image to the user. As discussed below, many techniques may be used to align and focus the composite image. For example, the first image may be focused prior to projecting the second image, the second image may then be projected and focused to match.

In some implementations, patterns, such as identifiers or markers may be included in the projected image to assist in image alignment. The patterns may be visual to the human or imperceptible to the human. In other implementations, edge detection of the image may be performed to determine the aspect ratio and any keystone effects resulting from an offset between the surface area and the projector. In still other implementations, knowledge of the image(s) being projected may be used to identify location points within the projected image for use in aligning a second projector.

Figure 5:
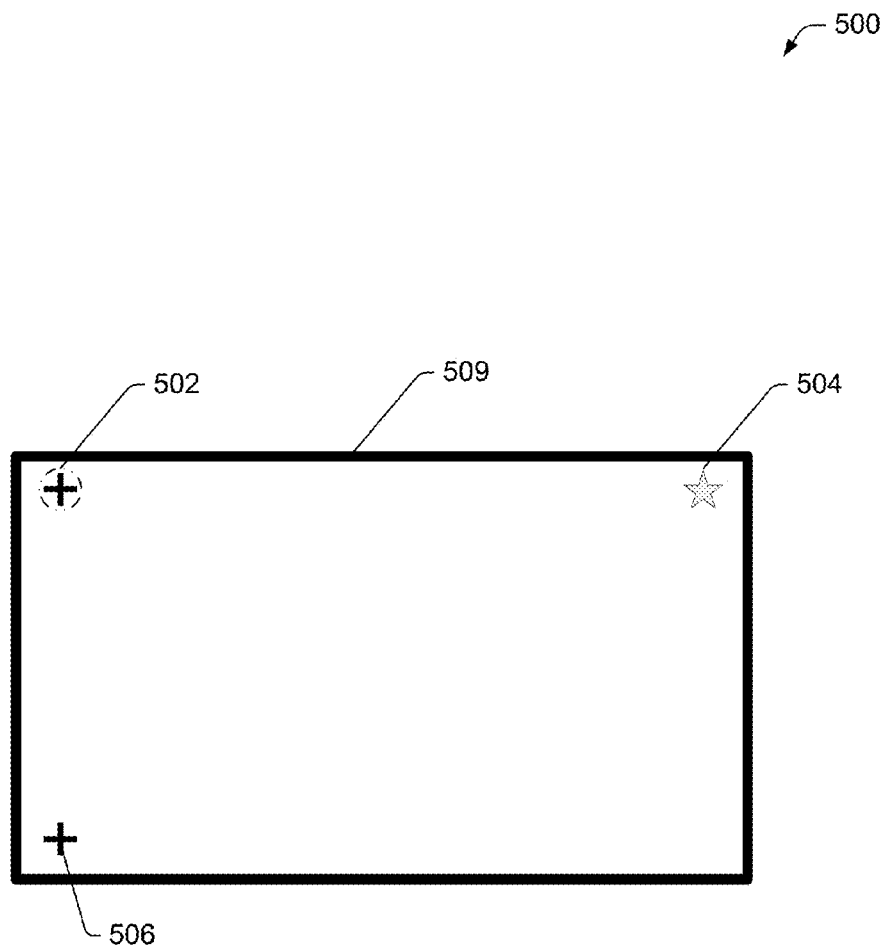
FIG. 5 illustrates one example of projecting an image with identifiers.

FIG. 5 illustrates one example of projecting an image 500 with one or more identifiers. In the example illustrated in FIG. 5, the projected image includes three patterns in the form of watermarks 502, 504, 506 at three corners of the image 500. The watermarks 502-506 may be visual watermarks that can be identified by a human or watermarks that are only perceptible to the camera of one or more of the ARFNs. The watermarks may each be different to assist in camera alignment. For example, the watermark 502 is a plus symbol surrounded by a dashed circle. In contrast, watermark 504 is the shape of star and watermark 506 is a plus symbol with no surrounding circle. Placing the watermarks or other identifiers near the corners of the image may assist in identifying not only the aspect ratio and position of the image but also any keystone effects present in the image.

In addition to identifying watermarks, the edge 508 of the image may be identified. In some implementations, the edge may be a border projected by the ARFN around the image, such as border 508. If a border is projected, it may be provided in a color that is a high contrast compared to the image and/or the surface upon which the image is projected. Using a high contrast border may assist in edge detection by other ARFNs. In other implementations, like the watermarks, the projected border may be viewable by a user or imperceptible.

It will be appreciated that any size, shape, number, color and/or positioning of patterns, such as watermarks, identifiers, borders or other forms of location recognition components may be used with the implementations described herein and the example of FIG. 5 is merely illustrative. In addition, in some implementations, the watermark or border may be projected at periodic intervals or constantly projected. For example, in the example of FIG. 5, one or more of the watermarks may only be projected once every 50 frames in a series of image frames. In such an example, even if the watermark is in the visible spectrum, a user may not perceive the presence of the one or more watermarks.

Figure 6:
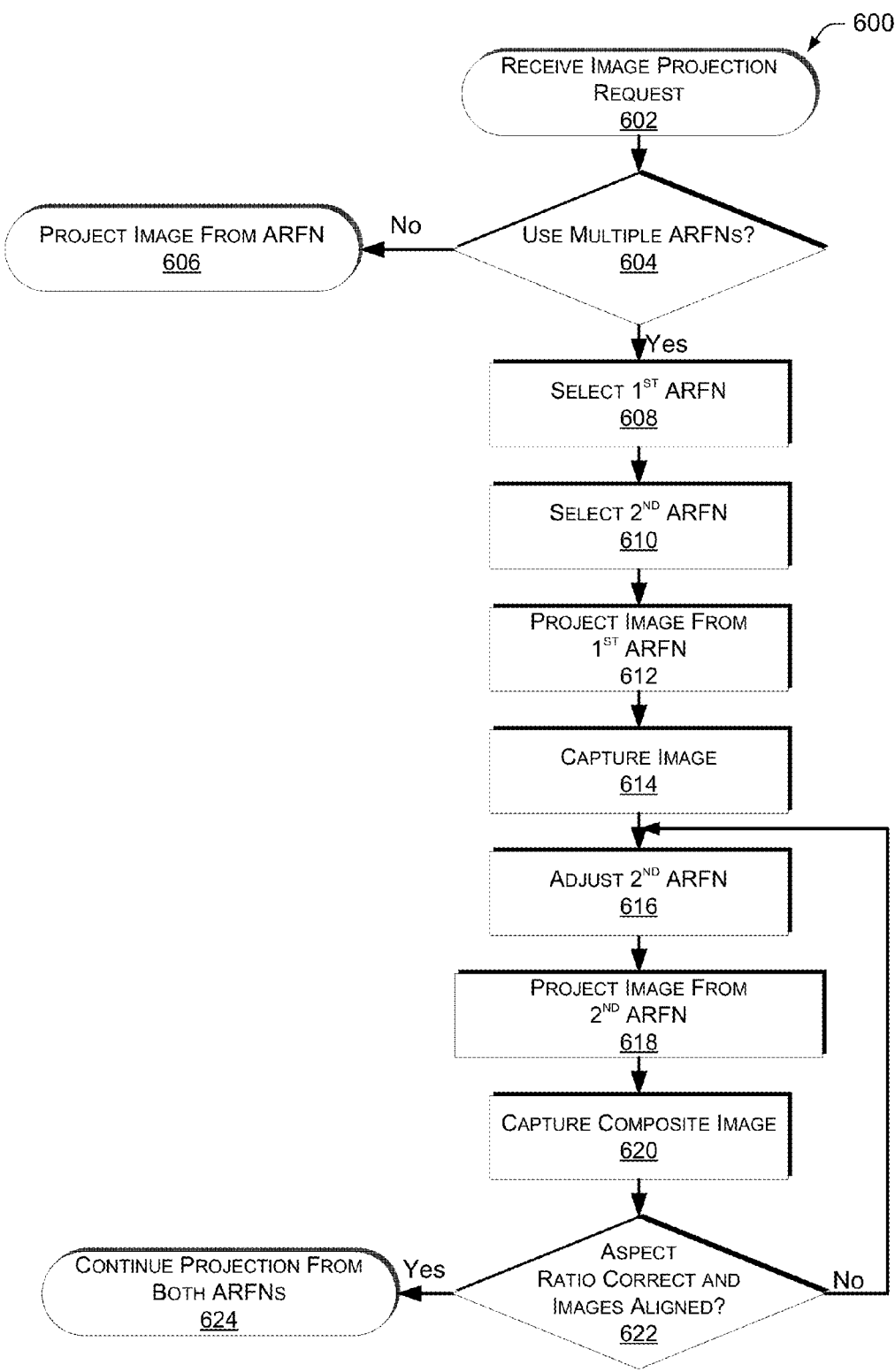
FIG. 6 illustrates a flow diagram of an example process for projecting a composite image from multiple source locations.

FIG. 6 illustrates a flow diagram of an example process 600 for projecting an image from multiple source locations onto a common surface location. The example process 600 initiates upon receiving a request to project an image onto a surface, as in 602. An image projection request may be received from a user via hand gestures, voice recognition or any other form of input. Upon receiving an image projection request, a determination may be made as to whether multiple ARFNs should project the image. In some implementations, multiple ARFNs may be used in every instance. In other implementations, a determination may be made as to whether the resulting image may benefit from multiple ARFNs projecting the image onto a common surface location. For example, the environmental conditions, such as the lighting and/or the reflective nature of the surface onto which the image is to be projected, may be considered. If the lighting conditions are such that an image from a single ARFN may appear washed out or otherwise difficult to see and/or if the surface does not have desirable reflective qualities, it may be determined that multiple ARFNs should project the image onto a common surface location.

In addition to considering environmental conditions, the capabilities of the available ARFNs may also be considered. If the only available ARFNs all utilize smaller projectors, such as pico-projectors that have limited lumen output, the example process 600 may determine that multiple ARFNS should be used in projecting the image onto the common surface location. In still other implementations, an image may be initially projected from a projector of a single ARFN and then captured with an image capture device of that ARFN, or another ARFN within the environment. The captured image may be analyzed to determine if the image as projected on the surface is of a sufficient quality or if a second ARFN should also project the image onto the common surface location to improve the image quality.

If it is determined that multiple ARFNs are not needed, the image may be projected from a projector of a single ARFN, as in 606. However, if it is determined that multiple ARFNs should be used to project the image onto a common surface location, a first ARFN may be selected, as in 608. The first ARFN may be randomly selected, selected based on the characteristics of the ARFN, selected based on the location of the ARFN, or based on other considerations. For example, in some implementations, multiple ARFNs may be identified and the one closest to the surface onto which the image is to be projected may be selected. In other implementations, as discussed below with respect to FIG. 8, if the ARFNs have different processing capabilities, the first ARFN may be selected from a group of available ARFNs based on the processing time necessary to process and project the requested image.

Once the ARFNs have been identified, the projection of the requested image may be initiated at the first ARFN, as in 612. Once the image has been processed and projected onto the surface by the first ARFN, an image capture device may capture the projected image as it appears on the surface, as in 614. The image capture device may be part of the second ARFN, part of the first ARFN, part of another ARFN within the environment or a standalone image capture device. In the example where the image capture device is not part of the second ARFN, alignment information may be determined and provided to the second ARFN. Alignment information may be, for example, the location of the projected image, the aspect ratio, and the like. Alignment information may be received from the ARFN projecting the image, determined by the second ARFN upon receiving the captured image, may be determined by another ARFN within the environment, determined by computing resources within the environment or determined by remote computing resources.

Regardless of the source of the alignment information, the projector of the second ARFN may be aligned such that the camera of the second ARFN is positioned to project an image onto a common surface location at the same aspect ratio as that of the first ARFN, as in 616. Once the projector of the second ARFN has been aligned, the second ARFN may project the image, as in 618. Projecting an image from both the first ARFN and the second ARFN onto a common surface location results in a composite image.

An image capture device may capture the composite image as projected onto the common surface location by the combination of the first ARFN and the second ARFN, as in 620. The captured image of the composite image may be analyzed to determine if the two images are aligned, synchronized and whether the composite image is in focus from the perspective of the user, as in 622. If it is determined that the two images are not synchronized, aligned and in focus, the example process 600 may return to block 616 and continue. However, if it is determined that the two images are aligned, synchronized and in focus, the example process 600 may continue projecting the image from both ARFNs, as illustrated by 624.

Figure 7:
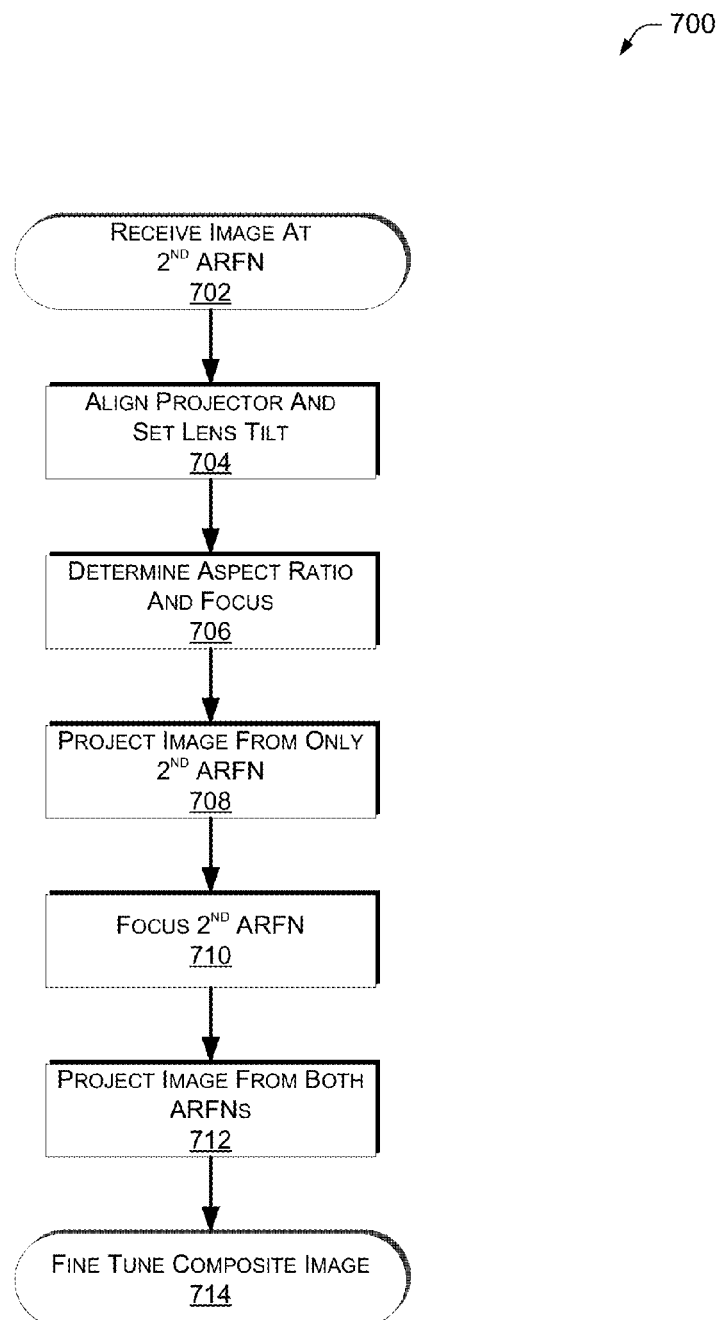
FIG. 7 illustrates a flow diagram for aligning multiple images projected onto a surface.

FIG. 7 illustrates a flow diagram of one implementation for aligning multiple images projected onto a surface. The example process 700 begins by receiving a second image, or alignment information at a second ARFN, as in 702. As discussed above, image information may be captured by a camera of the second ARFN, provided to the second ARFN from a remote image capture device, or provided in the form of alignment information from another image capture device.

Upon receiving the image and/or alignment information, the projector of the second ARFN may be aligned towards the surface upon which the image is projected and the lens tilt for the lens of the second ARFN projector may be set, as in 704. The alignment of the second ARFN may be done based on direction information obtained from the captured image with respect to the second ARFN, based on orientation information provided by the first ARFN and/or based on information provided by another source within the environment. The lens tilt may be set to counteract any keystone effect that may result from the position of the projector of the second ARFN in relation to the surface upon which the image is to be projected and/or to match any keystone effect resulting from the projection of the image from the first ARFN.

The aspect ratio and focus for the image may also be set as determined by the image information, as in 706. In some implementations, the aspect ratio may be determined based on the size of the image projected onto the surface, based on information provided by the first ARFN, or based on information determined by the second ARFN. For example, the first ARFN, which may include additional computational power compared to the second ARFN, may provide the distance between the first ARFN and the surface and/or the distance between the second ARFN and the surface. Likewise, the second ARFN may be capable of determining the distance from the projector of the second ARFN to the surface such that an aspect ratio may be established and the focal point set for the second ARFN.

Once the orientation, lens tilt, aspect ratio and focus of the projector of the second ARFN have been initially set, the second ARFN may project the image onto the common surface location, as in 708. In some implementations, projection of the image from the secondary ARFN may also result in the first ARFN temporarily ceasing projection of the image, as in 708. By temporarily ceasing projection of the image from the first ARFN, the second ARFN may project the image and make any adjustments that may be necessary, such as additional focus or alignment, as in 710.

Once the image from the projector of the second ARFN has been focused and properly aligned, the first ARFN may resume projection and both ARFNs may project the image onto the common surface location, as in 712. Finally, once both ARFNs are projecting the image onto the common surface location, fine tuning of the projectors may be done to focus, align or otherwise adjust the two images so the composite is in focus for the user, as in 714.

In other implementations, the second ARFN may initially project only a border that surrounds the image projected from the first ARFN and adjust the focus and aspect ratio of the border to match the edges of the projected image. Once matched, the image may also be projected from the second ARFN to generate a composite image. In still other implementations, the ARFNs may alternate projecting the image(s) so that each may independent adjust and focus their images. Again once both images are set to the same aspect ratio, in focus and synchronized, both images may be projected together onto the common surface location.

Figure 8:
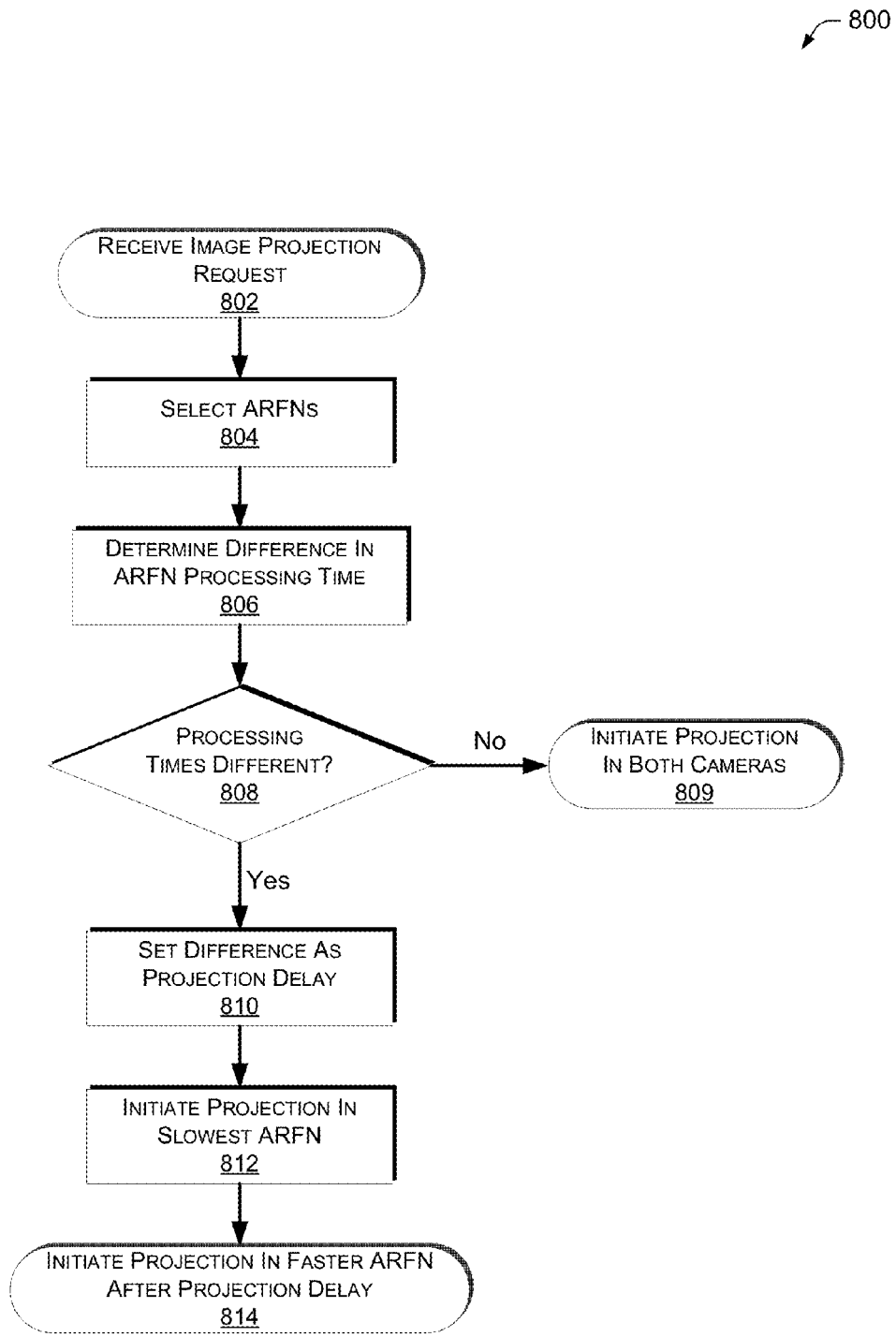
FIG. 8 illustrates a flow diagram for determining a projection delay for use in projecting multiple images synchronously.

FIG. 8 illustrates a flow diagram of an example process 800 for determining a projection delay for use in projecting multiple images synchronously. As noted above, in instances where multiple images are being projected in series (e.g., a video) it may be necessary to delay processing and projection from one or more of the ARFNs such that the projected images are synchronized. Similar to the example process 700 (FIG. 7), the example process 800 initiates upon receiving an image projection request, as in 802. Upon receiving an image projection request, and assuming that multiple ARFNs should be used to project the image, at least two ARFNs may be identified for image projection, as in 804. Once the multiple ARFNs have been selected, a difference in projector processing time for each may be determined, as in 806. For example, the time required for each ARFN to process and initiate projection of an image may be maintained and/or determined. If the image processing time for one or more of the ARFNs selected for projecting the image is different, as determined at decision block 808, a projection delay may be determined, as in 810. For example, if two ARFNs having different processing times have been selected to project the image onto a common surface location, the example process 800 may determine the difference between the processing times and set that difference as the projection delay. If more than two ARFNs have been selected for projecting the image, the ARFN with the longest processing time may be identified and a projection delay between that ARFN (the one with the longest processing time) and each of the other ARFNs may be determined and set as the projection delay for each respective ARFN. However, if the processing time for each selected ARFN is the same, projection from each ARFN may be initiated simultaneously, as in 809.

Finally, image projection may be first initiated at the ARFN with the longest processing time, as in 812, and projection from the other ARFN(s) may be initiated upon the projection delay time lapsing, as in 814. Delaying ARFNs with shorter processing times allows the ARFNs to each project an image onto a common surface location that is synchronized, regardless of the processing capabilities of the independent ARFNs.

Figure 9:
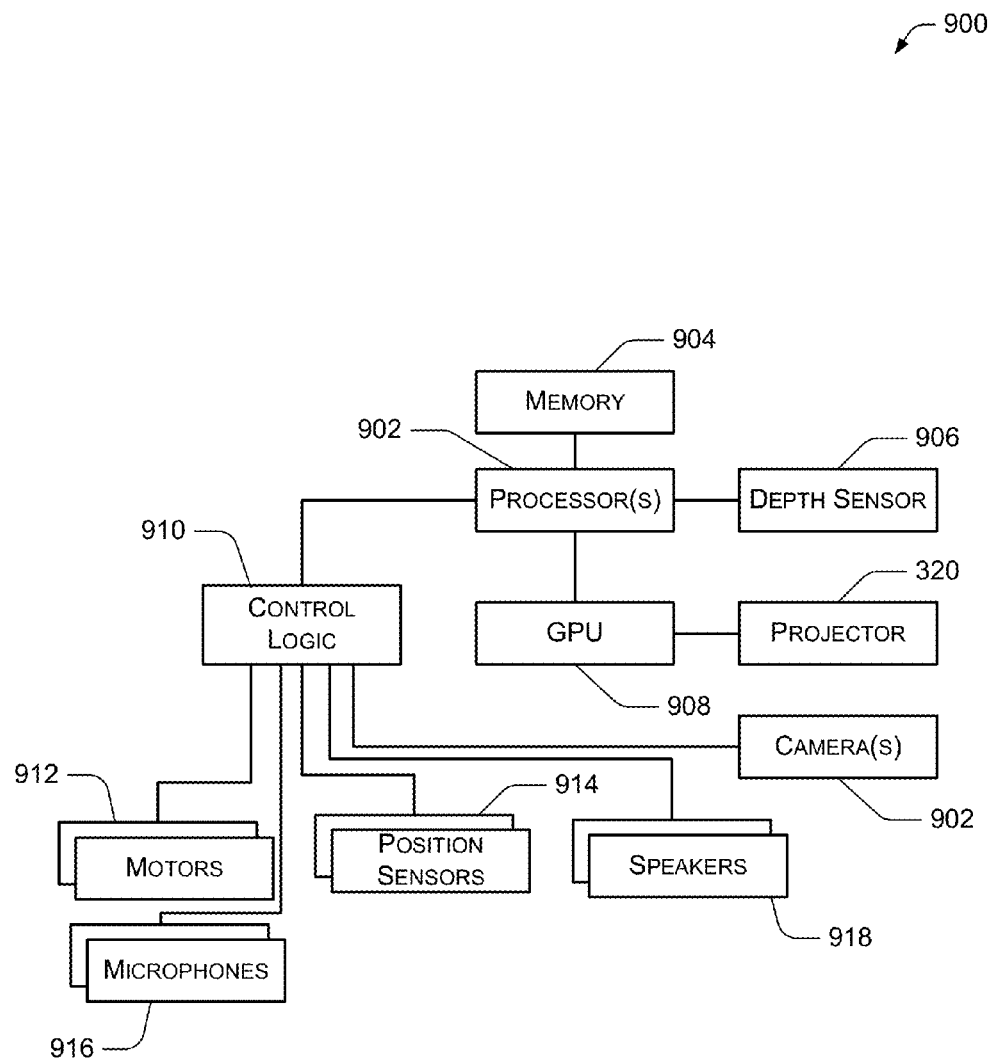
FIG. 9 is a block diagram of functional components that may be used in the implementations of FIGS. 2 and 3.

FIG. 9 shows functional components 900 that may be implemented as part of the lamp-embodied ARFN 102(2) of FIG. 3. The functional components 900 include one or more processors 902 coupled to memory 904. A depth sensor 906 may be coupled to the processor 902, formed as part of the processor 902, or implemented as firmware/software stored in the memory 904 and executed on the processor 902. A separate graphics processing unit (GPU) 908 may be coupled to the processor 902 to generate the images to be projected by the projector 320.

Control logic 910, such as a field programmable gate array (FPGA), is shown coupled to the processor 902 to control various electrical and mechanical components. For instance, the control logic 910 may be coupled to control various motors 912 for positioning the camera(s) 902. The control logic 910 may also be coupled to control position sensors 914, microphones 916, and speakers 918.

Although the subject matter has been described in language specific to structural features and techniques for projecting an image from multiple ARFNs, it is to be understood that the subject matter defined in the appended claims is not necessarily limited to the specific features described. Rather, the specific features are disclosed as illustrative forms of implementing the claims.

What is claimed is:

1. A method comprising:
   under control of one or more computing devices configured with executable instructions,
      receiving an image projection request to project an image onto a common surface location within an environment;
      identifying a plurality of augmented reality functional nodes within the environment for projecting the image;
      projecting a first instance of the image onto the common surface location from a first augmented reality functional node;
      capturing a second image using an image capture device, wherein the second image includes at least a portion of the first instance of the image as projected onto the common surface location;
      adjusting a second augmented reality functional node based on at least information obtained from the captured second image; and
      projecting an instance of a third image from the adjusted second augmented reality functional node onto the common surface location to provide a composite projection that includes at least a portion of an instance of the third image projected by the first augmented reality functional node and at least a portion of an instance of the third image projected by the second augmented reality functional node.

2. The method as recited in claim 1, further comprising:
   capturing a fourth image using at least one of the image capture device and the second image capture device, wherein the fourth image includes at least a portion of the composite projection as projected onto the common surface location;
   determining whether the composite projection is in focus based at least in part on information obtained from the captured fourth image; and
   if it is determined that the composite projection is not in focus, adjusting at least one of the first augmented reality function node and the second augmented reality functional node.

3. The method as recited in claim 1, further comprising:
   capturing a fourth image that includes at least a portion of the composite projection using the at least one of the image capture device and the second image capture device; and
   adjusting a projector of the second augmented reality functional node based at least in part on information obtained from the fourth image.

4. The method as recited in claim 3, wherein the information obtained from the fourth image includes at least one of an aspect ratio of the projected image, a pattern, a border, and a keystone effect.

5. The method as recited in claim 1, further comprising:
   determining a projection delay time between the first augmented reality functional node and the second augmented reality functional node.

6. The method as recited in claim 5, further comprising:
   waiting until expiration of the projection delay time before initiating projection of the second instance of the image from the second augmented reality functional node.

7. One or more non-transitory computer-readable media storing computer-executable instructions that, when executed on one or more processors, cause the one or more processors to perform acts comprising:
   projecting from a first projector a first instance of an image onto a common surface location;
   capturing with an image capture device a representation of at least a portion of the first instance of the image as projected onto the common surface location;
   adjusting a second projector with respect to the common surface location based at least in part on information obtained from the captured representation of at least a portion of the first instance of the image; and
   projecting a second instance of a second image from the second projector onto the common surface location to generate a composite projection, wherein the composite projection includes at least a portion of a first instance of the second image projected from the first projector and at least a portion of the second instance of the second image projected by the second projector.

8. One or more non-transitory computer-readable media as recited in claim 7, wherein the image capture device is in communication with the second projector.

9. One or more non-transitory computer-readable media as recited in claim 8, wherein the information obtained from the representation of at least a portion of the second image includes at least one pattern that is detectable by the image capture device.

10. One or more non-transitory computer-readable media as recited in claim 9, wherein the pattern is at least one of a watermark, an identifier, and a border.

11. One or more non-transitory computer-readable media as recited in claim 7, further comprising setting at least one of an aspect ratio and a focus for the second projector such that the second instance of the image projected from the second projector matches at least one of an aspect ratio and a focus of the first instance of the image projected from the first projector.

12. One or more non-transitory computer-readable media as recited in claim 7, the acts further comprising:
 prior to projecting the second instance of the image from the second projector, terminating projection of the first instance of the image from the first projector.

13. One or more non-transitory computer-readable media as recited in claim 12, the acts further comprising:
 focusing the second instance of the image projected from the second projector; and
 projecting the first instance of the image from the first projector and the second instance of the image from the second projector.

14. One or more non-transitory computer-readable media as recited in claim 7, the acts further comprising:
 adjusting a focus of at least one of the first projector and the second projector.

15. One or more non-transitory computer-readable media as recited in claim 7, the acts further comprising:
 adjusting an aspect ratio of at least one of the first projector and the second projector.

16. One or more non-transitory computer-readable media as recited in claim 7, wherein at least one of the first projector and the second projector are included in an augmented reality functional node.

17. One or more non-transitory computer-readable media as recited in claim 7, wherein the image is a series of images projected from the first projector and the second projector.

18. One or more computing devices comprising:
 one or more processors; and
 one or more non-transitory computer-readable media storing computer-executable instructions that, when executed on the one or more processors, cause the one or more processors to perform acts comprising:
 identifying a first projector and a second projector;
 determining a first processing time for the first projector;
 determining a second processing time for the second projector;
 determining a projection delay difference between the first projector and the second projector based at least in part on the determined first processing time for the first projector and the determined second processing time for the second projector;
 initiating projection of a first instance of an image from the first projector; and
 initiating projection of a second instance of the image from the second projector a projection delay difference after initiating projection of the first instance of the image such that the projection of the first instance of the image is synchronized with the projection of the second instance of the image.

19. One or more computing devices as recited in claim 18, wherein the first projector and the second projector have different processing capabilities, and wherein the projection delay difference is due at least in part to the different processing capabilities of the first projector and the second projector.

20. One or more computing devices as recited in claim 18, wherein the first instance of the image projected from the first projector and the second instance of the image projected from the second projector are both projected onto a common surface location.

21. One or more computing devices as recited in claim 18, further comprising:
 prior to identifying a first projector and a second projector, selecting the first projector and the second projector from a set of at least three projectors based on at least one of: (1) respective distances between each augmented reality node and a common surface location; and (2) differences in processing capabilities of the at least three projectors.

* * * * *